Aug. 27, 1957 F. G. RICHARDSON 2,804,180
CAGE NUT
Filed Feb. 16, 1955
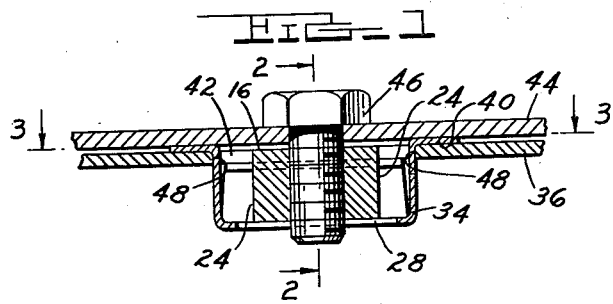
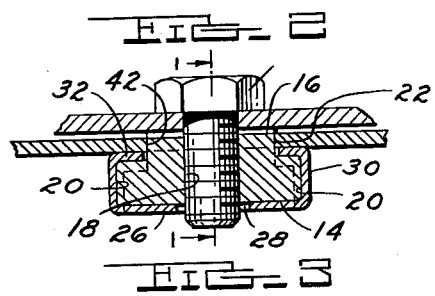
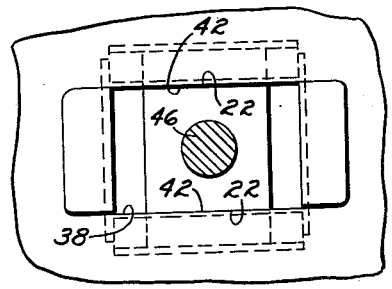
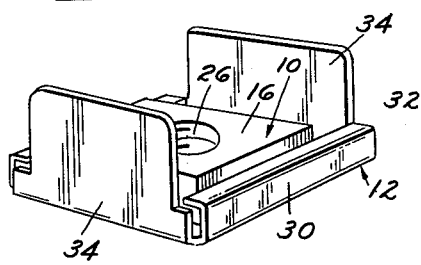
INVENTOR.
FREDERICK G. RICHARDSON
BY
Barnes, Kisselle, Laughlin & Raisch
ATTORNEYS

United States Patent Office 2,804,180
Patented Aug. 27, 1957

2,804,180

CAGE NUT

Frederick G. Richardson, Detroit, Mich.

Application February 16, 1955, Serial No. 488,531

6 Claims. (Cl. 189—36)

This invention relates to cage nuts.

Cage nut assemblies are generally used for mounting a nut on a sheet metal backing panel so that an overlying panel may be secured to the backing panel by means of a screw threaded into the nut without having access to the rear side of the backing panel. Most cage nuts with which I am familiar usually include a cage member which surrounds a relatively soft nut and which is provided with tabs or flanges arranged to be inserted through an opening in the backing panel and clinched over the edges of the opening. When a hardened screw is threaded into the nut, the nut is prevented from turning with the screw by engaging the side walls of the cage. One of the difficulties that has been experienced with this type of cage nut is that when used in production, the screws are threaded into the nut by means of power tools; and if it should happen that the screw "cross threads" in the nut, the power of the tool is often sufficient to cause the nut to distort the cage so that the nut turns therein or to distort the clinching tabs so that the whole cage turns in the opening in the backing panel. In any event, should the screw "cross thread" in the relatively soft nut, the cage nut must be removed from the panel and replaced with a new one. This is expensive and sometimes difficult, also, because access to the rear side of the panel, the side to which the cage nut is secured, can be had only with considerable difficulty.

Another difficulty that arises in using conventional cage nuts wherein the nut is invariably softer than the hardened bolt or screw used therewith is that since the screws or bolts are driven into the nut with power-driven torque wrenches, the maximum torque for which the wrench is set must be lower than the actual torque that could be safely applied so as to minimize the possibility of stripping the threads in the soft nut.

It is an object of the present invention to provide a cage nut assembly which when clinched on the backing panel causes the nut itself to lock with the edges of the aperture in the backing panel so that the backing panel itself prevents rotation of the nut.

A further object of the invention resides in a provision of a cage nut assembly which enables the application of greater torque to the bolt or screw threaded into the nut and which therefore results in a tighter assembly.

In the drawings:

Fig. 1 is a sectional view of a plate and cage nut assembly of this invention.

Fig. 2 is a sectional view taken transversely of the section of Fig. 1 along the line 2—2 in Fig. 1.

Fig. 3 is a sectional view taken along the line 3—3 in Fig. 1.

Fig. 4 is a perspective view of the cage nut assembly of this invention prior to clinching upon a backing panel.

The cage nut of this assembly generally comprises a steel nut member 10 and a casing or cage member 12. Nut member 10 is hardened either throughout or on the surface such as by case hardening. Referring particularly to Fig. 2, the nut member 10 has a bottom face 14, a top face 16 and a threaded central aperture 18 extending through the body of the nut. The nut 10 is of generally rectangular shape; and at the bottom portion thereof, it is provided with laterally extending flanges 20 along two of the opposite faces 22 of the nut. Flanges 20 as is clearly seen in Fig. 2 are of substantially less height than the body of the nut. The opposite side faces 24 of the nut are substantially vertical.

Cage 12 is also of generally rectangular shape and includes a bottom wall 26 which underlies the bottom face 14 of the nut. Wall 26 is provided with an opening 28 which is of elongated form as shown in Fig. 1. The bottom wall 28 is turned upwardly along each edge to provide side walls for the cage. The side walls 30 adjacent the flanges 20 extend upwardly and then inwardly as at 32 to overlie the top faces of flanges 20 and thus prevent separation of the nut and the cage in a vertical direction. The other side walls 34 of the cage are spaced apart a distance substantially greater than the width of the nut between the walls 24 so that the nut can shift laterally of the cage between the side walls 34 (Fig. 1). Walls 34 extend upwardly beyond the top face 16 of the nut. It will be noted that the width of walls 34 is less than the distance between the vertical side wall portions 30.

In mounting the nut described on a sheet metal backing panel such as indicated at 36, the panel is provided with a rectangular opening 38, the width of which corresponds generally to the width of the walls 34 and the length of which corresponds generally to the distance between the outer faces of walls 34. The cage nut assembly is mounted on the panel by inserting the walls 34 through the opening 38 until the inwardly bent portions 32 of walls 30 abut against the underside of panel 36 as shown in Fig. 2. The upper projecting ends of walls 34 are then clinched around the opposite edges of opening 38 as at 40 (Fig. 1). Thus, the cage nut assembly is securely locked in the opening on panel 36.

Referring now to Fig. 2, it will be observed that when the cage is clinched in place as described, the upper portion of the nut body extends into the plane of panel 36 and the side faces 22 of the nut are rather closely engaged with the edges 42 of opening 38. Thus, when a second panel 44 is arranged in a position overlying panel 36 and a screw 46, softer than nut 10, is extended through panel 44 and threaded into nut 10, the nut is prevented from turning, not only by reason of the engagement of the walls 34 of the cage with the edges 48 of opening 38 and by reason of the engagement of the flanges 20 with the side walls 30, but also by reason of the engagement of the side faces 22 of the nut with the side edges 42 of the opening 38 in the panel. When it is considered that in most applications, the backing panels such as shown at 36 are usually of heavier gage than the sheet metal from which the cage 12 is fashioned, it will be appreciated that the present construction is a distinct advantage over prior constructions where the strength of the cage alone is depended upon for preventing turning of the nut within the cage or turning of the whole cage within the opening in the backing panel.

In practice, it has been found that with the present construction, if the relatively soft bolt should be cross threaded when it is started through the opening 26, it will actually be driven through the nut in cross threaded relation without causing turning of the nut in the cage; and furthermore, the hardened threads on the nut will often cut cross threads on the bolt to produce a satisfactory tightening action.

Thus it will be seen that I have provided a cage nut assembly which is no more expensive to manufacture than conventional cage nuts and nevertheless is arranged to lock the nut on the backing panel on which it is mounted in a manner which more positively prevents the nut from turning should a screw become cross threaded in the nut when it is driven.

Furthermore, by making the nut harder than the bolt, rather than softer than the bolt, which is conventional practice, I eliminate one of the most serious problems encountered in using conventional cage nuts. Since, in my arrangement, the bolt is softer than the nut, the bolt will strip rather than the nut; and it is an easy matter to replace a stripped bolt whereas it is often very difficult to replace a stripped nut. In addition, the hardened threads of the nut will withstand a greater torque before stripping than is the case with the threads of a hardened bolt. Thus, with my arrangement, the torque that can be used for tightening the bolts can be greater than with conventional arrangements where the bolt is harder than the nut; and a tighter assembly results.

This application is a continuation-in-part of my co-pending application Serial No. 412,441, filed February 25, 1954, and now abandoned.

I claim:

1. In combination, a nut having a relatively large portion and a relatively smaller portion, said smaller portion having at least one substantially straight side, said smaller portion having substantial thickness sufficient to resist deformation by turning force of normal torque a panel having a slot of a length greater than the width of the smaller portion of the nut, said slot having parallel opposite side walls spaced apart a distance approximately equal to the width of the smaller portion of the nut, said smaller portion of said nut extending into said slot with said straight side slideably engaging one of said parallel slot walls whereby the smaller portion of the nut is non-rotatably and slidably received and whereby the nut is slidable in said opening but prevented from turning relative to the panel when the smaller portion of the nut is positioned in said opening, a cage member enclosing at least a portion of the larger part of the nut, said cage member being integrally secured to said panel to hold the smaller portion of the nut within said panel slot.

2. The combination set forth in claim 1 including an apertured member positioned against said panel with the apertures registering and a screw extending through said apertures and threaded into said nut, said nut being relatively hard as compared with said screw.

3. In combination, a panel having a generally rectangular aperture therein, a cage fixed on said panel at said aperture, and a T-nut having its wide portion disposed within said cage and its narrow portion within said aperture, said narrower portion having substantial thickness sufficient to resist deformation by turning force of normal torque, said aperture having parallel opposite side walls of about the width of the narrow portion of the nut, said cage holding said nut against substantial axial movement and holding said narrow portion of the nut in slideable engagement with the parallel side walls of the panel aperture whereby the narrow portion of the nut is slidable within said cage and said rectangular aperture in the panel.

4. The combination called for in claim 3 including a second apertured panel overlying the first mentioned panel, and a screw extending through said apertures and threaded into said nut for mounting said panels one on the other, said nut being relatively harder than said screw.

5. A panel and cage nut assembly comprising a generally rectangularly shaped nut provided with top and bottom faces and a threaded aperture extending therethrough, said nut having at a pair of opposite faces at one end thereof laterally extending flanges, the bottom faces of which are coplanar with the bottom face of the nut and the top faces of which are spaced substantially below the top face of the nut, a sheet metal cage surrounding and slidably holding said nut and having a bottom wall underlying the bottom face of the nut and a pair of side walls extending upwardly around said flanges and inwardly over the top faces of said flanges to form opposed shoulders on said cage disposed below the plane of the top face of the nut, said cage also having a second pair of side walls extending upwardly beyond the top face of the nut, the opposite vertical side edges of the portions of said second pair of side walls of said cage extending above said shoulders being aligned generally with the respective planes of the first mentioned opposite end faces of the nut which project above the top faces of said flanges, said second pair of side walls being spaced apart a distance greater than the width of the nut above the flanges, a panel provided with a generally rectangular opening therein which corresponds generally in size with the area defined by the portions of said second pair of side walls extending above said flanges, said panel opening including a pair of walls spaced apart a distance greater than the width of the portion of the nut above the flanges and a pair of parallel side walls of about the width of the portion of said nut above said flanges, the portion of said nut above said flanges extending upwardly into said opening above said opposed cage shoulders with a pair of opposite side faces of the nut engaging said pair of parallel edges of said opening to prevent relative rotative movement between said nut and panel while permitting sliding movement of the nut in the opening, said second mentioned side walls of said cage extending upwardly through said opening and being clinched over the top face of said panel, said inwardly extending portions of said cage side walls engaging the bottom face of said panel, and the shoulder portions of the first mentioned side walls clamped between the top face of the nut flanges and the underside of the panel when the nut is drawn up tightly as by a screw extending through the aperture in the panel.

6. The combination called for in claim 5 including a member overlying the top face of said panel and having an opening therein registering with the threaded opening in the nut, a screw extending through said aligned openings and threadedly engaged with the threaded opening in the nut, said screw tightly clamping said overlying member against said panel and clamping said inwardly extending portions of the side walls of the cage between the top faces of the flanges on the nut and the bottom face of the panel adjacent the opening therein.

References Cited in the file of this patent

UNITED STATES PATENTS

| | | |
|---|---|---|
| 226,450 | Ibbotson et al. | Apr. 13, 1880 |
| 1,753,791 | Kiesel | Apr. 8, 1930 |
| 1,872,385 | Andren | Aug. 16, 1932 |
| 2,084,926 | Tinnerman | June 22, 1937 |
| 2,144,350 | Swanstrom | Jan. 17, 1939 |
| 2,201,401 | Jones | May 21, 1940 |
| 2,249,923 | Whitcombe | July 22, 1941 |
| 2,278,790 | Langmaid | Apr. 7, 1942 |
| 2,413,669 | Whitcombe | Dec. 31, 1946 |
| 2,678,075 | Murphy | May 11, 1954 |